US008873608B2

(12) United States Patent
Azary

(10) Patent No.: US 8,873,608 B2
(45) Date of Patent: Oct. 28, 2014

(54) MEASUREMENT OF IQ IMBALANCE IN A VECTOR MODULATOR

(71) Applicant: Tektronix, Inc., Beaverton, OR (US)

(72) Inventor: Zoltan D. Azary, Santa Rosa, CA (US)

(73) Assignee: Tektronix, Inc., Beaverton, OR (US)

( * ) Notice: Subject to any disclaimer, the term of this patent is extended or adjusted under 35 U.S.C. 154(b) by 51 days.

(21) Appl. No.: 13/683,102

(22) Filed: Nov. 21, 2012

(65) Prior Publication Data

US 2014/0140382 A1 May 22, 2014

(51) Int. Cl.
*H04B 3/46* (2006.01)
*H04B 17/00* (2006.01)
*H04Q 1/20* (2006.01)
*H04B 1/62* (2006.01)
*H04L 27/36* (2006.01)

(52) U.S. Cl.
CPC ............... *H04B 1/62* (2013.01); *H04L 27/364* (2013.01)
USPC .......................................... 375/224; 375/231

(58) Field of Classification Search
CPC ................................. H04L 27/364; H04B 1/62
See application file for complete search history.

(56) References Cited

U.S. PATENT DOCUMENTS

| 7,515,650 B1* | 4/2009 | Warner et al. ................ 375/302 |
| 2004/0095995 A1* | 5/2004 | Matreci et al. ............... 375/224 |
| 2004/0165678 A1* | 8/2004 | Nadiri .......................... 375/296 |
| 2005/0118963 A1* | 6/2005 | Chiu ......................... 455/115.1 |
| 2008/0025381 A1* | 1/2008 | Lee et al. ..................... 375/219 |
| 2009/0270053 A1* | 10/2009 | Bury ............................ 455/102 |
| 2013/0243061 A1* | 9/2013 | Dark ............................ 375/224 |

* cited by examiner

*Primary Examiner* — Erin File
(74) *Attorney, Agent, or Firm* — Marger Johnson & McCollom PC

(57) ABSTRACT

Described are methods of determining imbalance in an IQ modulator. Example methods include applying a set of at least three test signals to the I channel and Q channel to generate an output, then receiving output from a frequency measuring device coupled to the IQ modulator. Some of the set of test signals may be substantially different than other test signals in the set. After the frequency specific output is received, the method measures one or more values and derives the imbalance in the IQ modulator from the measured values. Embodiments also include adjusting parameters of the test signals until a minimum distance is measured. A device is also described, which includes a test signal generator, an output analyzer, and a minimizer structured to cause the test signal generator to generate a set of test signals that cause a distance measured in the output to be a minimum distance.

12 Claims, 11 Drawing Sheets

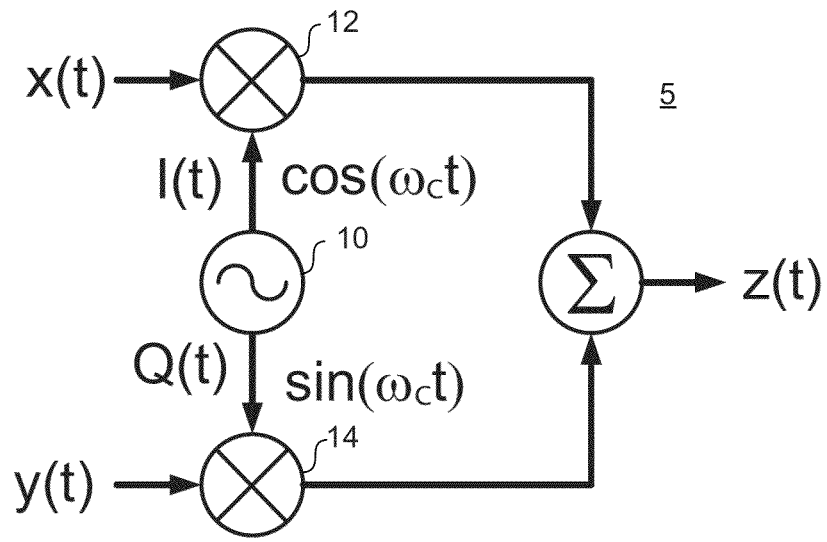
FIGURE 1
(Conventional)
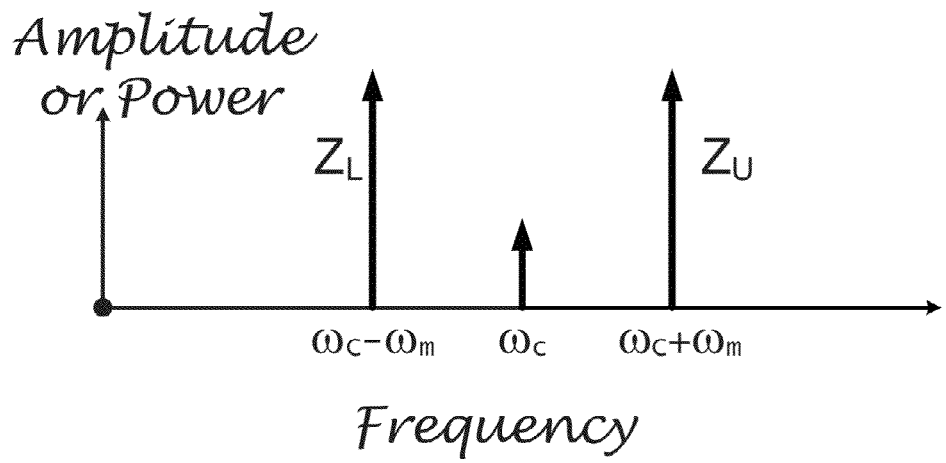
FIGURE 2
(Conventional)

MEASUREMENT OF IQ IMBALANCE IN A VECTOR MODULATOR

FIELD OF THE INVENTION

This disclosure is directed to a method for measuring amplitude and phase imbalance in IQ modulators.

BACKGROUND

IQ modulators are well known in the field of RF and microwave communications, finding use in both analog and digital modulation formats. IQ modulation is a method of modulating a carrier wave, which is typically but not always sinusoidal, with two baseband input signals. The two signals are oftentimes referred to as I (in-channel) and Q (quadrature-phase) components.

FIG. 1 is a block diagram of an example conventional I-Q modulator 5. It contains a local oscillator (or "LO") 10 producing sinusoidal signals at a carrier frequency (designated as $\omega_c$ where). The LO has two outputs, which are of equal magnitude and differ in phase by exactly 90 degrees. The signal from the LO 10 are multiplied in mixers 12, 14 by two independent baseband inputs, the I and Q inputs. These products of the I and Q inputs and the carrier frequency w, are summed to yield the frequency-converted result. Baseband inputs may contain any arbitrary waveforms, although the bandwidth of these is usually less than the carrier frequency.

Although ideal modulators will generate I and Q channels that have exactly the same amplitude gain across the desired frequencies, and will be out of phase from one another by exactly 90 degrees, real-world implementations of the I and Q signals do not have identical magnitudes and do not differ in phase by exactly 90 degrees. Additional non-ideal aspects of the I-Q modulator such as differing gains and phases between the two mixers can also be modeled as amplitude and phase imbalances between the I and Q LO signals. These imbalances may affect the quality of the generated signal from the modulator.

IQ imbalance degrades the quality of digital communications signals. Quality measurements such as sideband suppression ratio and Error Vector Magnitude (EVM) are made worse by the presence of these errors. The presence of IQ imbalance also reduces the tolerance for other impairments such as noise and distortion in the overall system.

In modern digital communications systems and test equipment, if these IQ imbalance errors are known or can be measured, then the signals driving the I and Q channels can be corrected, often called "pre-distortion," using well known techniques to improve the overall output signal quality.

There are conventional methods for measuring the IQ imbalance, but these measurement methods suffer from deficiencies such as having inherently large measurement error, being tedious to measure, and testing methods suffering from being tested using signals not often found when the modulators are put in use. Thus conventional IQ imbalance testing methods are inaccurate, take too long, or are not applicable to production devices.

Embodiments of the invention address these and other limitations of the prior art.

SUMMARY OF THE INVENTION

Aspects of the invention include methods of determining imbalance in an IQ modulator. In such methods, a set of at least three test signals, which may include multiple simultaneous frequencies, are applied to the I channel and Q channel of the IQ modulator to generate an output. In some embodiments at least one of the set of test signals is substantially different than other test signals in the set. Then frequency specific output are received from a frequency measuring device coupled to the output of the IQ modulator. After one or more values of the frequency specific output is measured, the imbalance in the IQ modulator is derived from the measured values. In some embodiments the measured values may include an amplitude of a sideband signal. And in some embodiments, deriving the imbalance in the IQ modulator from the measured values can include determining a length of the I and Q vector, and calculating an angle between the I vector and the Q vector.

In some aspects of the invention the test signals are adjusted until the calculated distance is a minimum desired distance. In other aspects the adjusting of a factor of the test signals continues until the calculated distance does not change more than a threshold amount when the factor is adjusted less than a threshold amount.

In some embodiments, the set of test signals may include a set of four test signals that would cause an ideal IQ monitor to generate an output for the set that is equal in amplitude and spaced 90 degrees apart. This set of test signals may then be applied to a non-ideal IQ monitor.

Other aspects of the invention include a device structured to determine imbalance of an IQ modulator. The device includes a test signal generator structured to generate a set of test signals for the IQ modulator, an output analyzer structured to receive a frequency specific output of the test signals from a measurement device coupled to an output of the IQ modulator, and a minimizer structured to cause the test signal generator to generate a set of test signals that cause a distance measured from the frequency specific output to be a minimum distance.

BRIEF DESCRIPTION OF THE DRAWINGS

FIG. 1 is a block diagram of an example conventional I-Q modulator.

FIG. 2 is a graph showing spectral components of the output of a conventional I-Q modulator.

DETAILED DESCRIPTION

Figure 3:
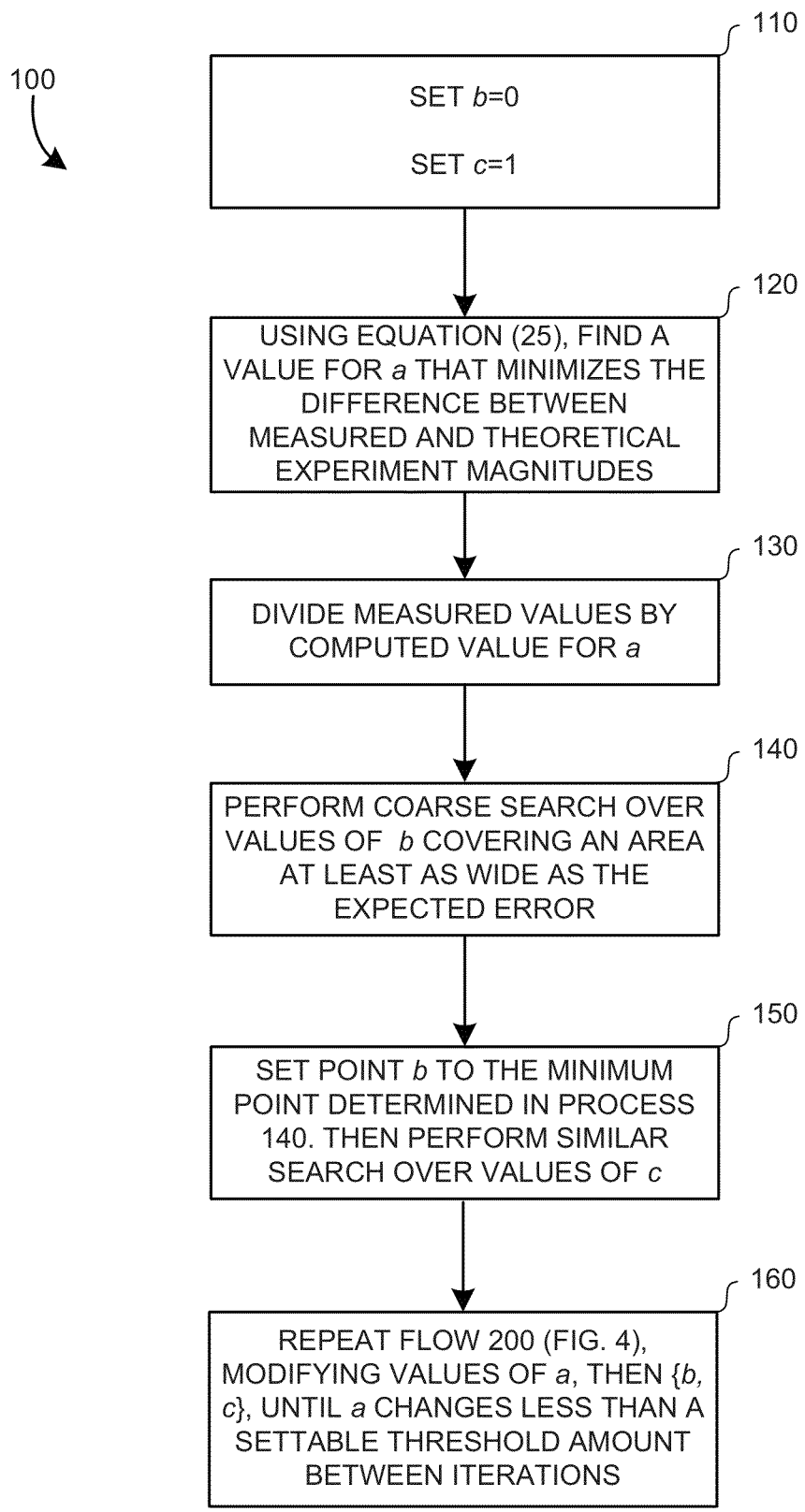
FIG. 3 is a flow diagram illustrating example methods of determining IQ imbalance according to embodiments of the invention.

This disclosure generally considers the use of IQ modulators in signal generation systems, not receiving equipment, although embodiments of the invention are also applicable to receivers. As such, it is assumed that the baseband signals are input signals, and not output signals as would be the case with receiving equipment.

As shown in FIG. 1, the baseband inputs are designated as x (In-phase) and y (Quadrature), while the two signals from the LO 10 are designated I and Q. When represented using phasor notation at the carrier frequency $\omega_c$, the two signals from the LO 10 are simply:

$$I = e^{j0} = 1, \quad (1)$$
$$Q = e^{j\frac{\pi}{2}} = j$$

The output of the modulator 5 is the sum of these two quadrature LO signals multiplied by the two baseband modulation inputs (represented by {x, y} in FIG. 1):

$$z = xI + yQ = x + jy \quad (2)$$

In this way, the I-Q modulator 5 takes real-valued baseband inputs {x, y} to produce an output that is indistinguishable from an up-converted complex-valued input (x+jy).

Although useful baseband signals are often arbitrary waveforms, for analysis, in this disclosure they are defined as sinusoids at some modulation frequency, $\omega_m$. Each baseband signal x, y, will have an independent amplitude and phase, each defined by a complex number, $\{\alpha, \beta\}$. The peak amplitude of each sinusoid is equal to the magnitude of the corresponding complex number and the phase is likewise determined by the angle of the complex number. Mathematically, the following formulas represent these signals:

$$x = |\alpha|\cos(\omega_m t + <\alpha) = \frac{1}{2}[\alpha e^{j\omega_m t} + \alpha^* e^{-j\omega_m t}] \quad (3)$$

$$y = |\beta|\cos(\omega_m t + <\beta) = \frac{1}{2}[\beta e^{j\omega_m t} + \beta^* e^{-j\omega_m t}] \quad (4)$$

After being multiplied by the LO sinusoids in the two mixers 12, 14, positive and negative frequency components of the x and y signals result in two spectral components at the output, one at frequency $(\omega_c + \omega_m)$ and the other at $(\omega_c - \omega_m)$. This is depicted in FIG. 2.

In phasor notation, the upper and lower sidebands are:

$$z_u = \alpha I + \beta Q; \; z_L = \alpha^* I + \beta^* Q \quad (5)$$

For the ideal I-Q modulator (i.e., the I and Q signals are of equal magnitude and in perfect quadrature), this can be further simplified to:

$$z_u = \alpha I + \beta Q = \alpha + j\beta; \; z_L = \alpha^* I + \beta^* Q = \alpha^* + j\beta \quad (6)$$

The magnitude of the upper and lower sideband components are not, in general, identical. For example, if the following values are chosen:

$$\alpha = 1, \quad (7)$$
$$\beta = e^{-j\frac{\pi}{2}}$$

it is easily verified that $$z_u = 2, z_L = 0 \quad (8)$$

A frequency-selective measurement device such as a scalar spectrum analyzer allows the upper and lower sideband magnitudes to be measured separately. The independent measurement of sidebands is important to the measurement methods described herein.

Although this disclosure gives example and discussion with reference to the upper sideband component, these concepts and methods apply equally to the lower sideband as well.

By appropriate choice of $\{\alpha, \beta\}$, any linear combination of the I and Q vectors can be generated at the output of the modulator 5. Since the scaling factors $\{\alpha, \beta\}$ are complex, the I and Q vectors can be rotated in addition to being scaled as part of the linear combination.

As described above, in real-world implementations, the I and Q signals do not have identical magnitudes and do not differ in phase by exactly 90 degrees. Additional non-ideal aspects of the I-Q modulator such as differing gains and phases between the two mixers can also be modeled as amplitude and phase imbalances between the I and Q LO signals.

Without loss of generality, the I vector can be arbitrarily defined to be one, but the Q vector is now $$Q = (1 + \epsilon)e^{j[\frac{\pi}{2} + \gamma]} \quad (9)$$

where $\epsilon$ and $\gamma$ represent errors in magnitude and phase respectively. Such errors are often referred to as "IQ imbalance." These errors often vary with changes in both modulation and carrier frequency.

Typically, to measure IQ imbalance, a frequency-selective measurement device such as a spectrum analyzer is used to measure of the amplitude of either the upper or lower sideband independently. The goal is to measure the relative amplitude and phase difference between the I and Q LO signals—ideally the amplitudes should be identical and the phase difference exactly 90 degrees. Further, measurements according to embodiments of the invention will also include any phase and amplitude variations in the baseband signal paths as well, although, for purposes of this disclosure, these imbalances may be considered part of the imbalance in the I and Q signals.

Above, before defining Q in equation 9, it was possible to arbitrarily assign the I-vector a magnitude of one. In a real world measurement scenario, this is not possible because the I-vector's magnitude is not known a-priori and must be determined by measurement. However, since only the relative angle between I and Q vectors is of interest, the I vector can still be arbitrarily assigned an angle of zero:

$$I = a \quad (10)$$

The Q vector has both an unknown angle and length:

$$Q = a(b + jc) \quad (11)$$

If there is no imbalance, then {a=1, b=0, c=1}. To determine the values of these unknowns, experimental linear combinations of the I and Q vectors are generated at the modulation frequency. For the upper sideband in (5) we have:

$$E = \alpha I + \beta Q = a(\alpha + \beta(b+jc)) \qquad (12)$$

where E is an experimental test signal and I and Q are non-ideal as defined in (10) and (11). A similar result is easily derived for the lower sideband, although, as described above, this disclosure is directed only to the upper sideband.

Next, the magnitude of the upper sideband at a frequency of $(\omega_c + \omega_m)$ is measured. The real and imaginary parts of $\{\alpha, \beta\}$ are designated by r and i subscripts. The test signal, E is then:

$$E = a[(\alpha_r + \beta_r b - \beta_i c) + a(\alpha_i + \beta_i b + \beta_r c)] \qquad (13)$$

Its magnitude squared (denoted by U) is then:

$$U_{\alpha,\beta}(a, b, c, \alpha, \beta) \equiv |E|^2 \qquad (14)$$

$$= |\alpha I + \beta Q|^2$$

$$= a^2[(\alpha_r + \beta_r b - \beta_i c)^2 + (\alpha_i + \beta_i b + \beta_r c)^2] \qquad (15)$$

$$= a^2[|\alpha|^2 + |\beta|^2 b^2 + |\beta|^2 c^2 + 2(\alpha_r \beta_r + \alpha_i \beta_i)b + 2(\alpha_i \beta_i - \alpha_r \beta_r)c] \qquad (16)$$

Expanding (15) completely gets rather messy and the intermediate steps have been omitted. The (bc) cross-product ends up being canceled out and was not mistakenly omitted. Viewed as a function of the I and Q vectors (defined by $\{a, b, c\}$), this function is quadratic in those variables.

Since there are three unknowns here (a, b, c) it will require measurements of three different (independent) linear combinations of the I and Q vectors to solve for all three variables. Subscripts can be added to $\{\alpha, \beta\}$ to denote different experiments and a subscripted letter m represents the measured upper (or lower) sideband magnitudes (squared). A set of experimental linear combinations can be defined as $$L = \begin{bmatrix} \alpha_1 & \beta_1 \\ \alpha_2 & \beta_2 \\ \alpha_3 & \beta_3 \end{bmatrix} \qquad (17)$$

Equation (17) includes three experiments in set L, but L can have more than three rows. The vector of output signals from the IQ modulator S is then $$S = L \begin{bmatrix} I \\ Q \end{bmatrix} \qquad (18)$$

For these experiments, the following system of (non-linear) equations results:

$$F(a, b, c) = \begin{bmatrix} \sqrt{U(a, b, c, \alpha_1, \beta_1)} \\ \sqrt{U(a, b, c, \alpha_2, \beta_2)} \\ \sqrt{U(a, b, c, \alpha_3, \beta_3)} \end{bmatrix} = \begin{bmatrix} m_1 \\ m_2 \\ m_3 \end{bmatrix} = m \qquad (19)$$

In practice, there will be both errors and noise in the measured results (m). As a result, the problem is more properly described like the following:

$$F(a,b,c) = m + = \hat{m} \qquad (20)$$

Without an estimate of the error vector (e), it is only possible to search for a solution to (20) instead of (19). The perturbed equation may not have a real-valued solution, and even if a real-valued solution exists it will not give the true value of x.

The problem is then better treated as a minimization problem: that of finding $\{a, b, c\}$ such that some measure of distance between m (as defined in (19)) and the actual measured values ($\hat{m}$ in (20)) is minimized. To reduce the effect of noise, it may be desirable to over-constrain the problem by taking more than three measurements:

$$F(a, b, c) = \begin{bmatrix} m_1 \\ m_2 \\ \vdots \\ m_n \end{bmatrix} \quad n > 3 \qquad (21)$$

There are many possibilities for a metric on the distance between m and $\hat{m}$. One obvious choice is:

$$D = |m - \hat{m}|^2 \qquad (22)$$

In fact this turns out to be a particularly useful choice. Notice that in (12) the magnitude of the result varies linearly with a. It should be obvious then, that m in (19) also scales linearly with a.

$$F(a,b,c) = a\, F(1,b,c) \qquad (23)$$

Assume that at one point in the optimization algorithm, $\{b, c\}$ are fixed and the goal is to find a value for a that minimizes the (Euclidean) distance between a set of theoretical experimental magnitudes (m in (19)) and measured values ($\hat{m}$ in (20)). Different values of a define a line through the origin, with m as a basis vector for this n-dimensional space.

The closest point on that line to $\hat{m}$ occurs when $$F(1,b,c) \cdot (a\, F(1,b,c) - \hat{m}) = 0 \qquad (24)$$

or when $$a = \frac{F(1, b, c) \cdot \hat{m}}{F(1, b, c) \cdot F(1, b, c)} \qquad (25)$$

An example method for minimizing this function according to embodiments of the invention is illustrated in FIG. 3. One part of the overall strategy is to linearly scale the measured values so that a=1, rather than to find a value of a corresponding to the magnitude of the I vector. It is also possible to compute "a" and carry it along through the process.

In a first operation 110 of an example flow, 100, variables b and c are set so b=0 and c=1. Then, in an operation 120, the equation (25) is used to find a value for a that minimizes the difference between measured and theoretical experiment magnitudes. Next, the measured values are divided by the computed value for a in an operation 130. next, an operation 140 of a coarse search is performed over values of b covering an area at least as wide as the expected error. For this search, set c=1. Additionally, for each search point, the distance from equation (22) is determined and the minimum found point recorded.

In a process 150, the point b is set to the minimum point found above and then perform a similar search over values of c, again saving the minimum point found.

The processes 110-150 of FIG. 3 are used to locate a starting point for a more accurate search. The processes 110-150 ensure that the starting point is not confused with any local minima that are not the global minima of interest. Then, a process 160 is performed until exit criteria are met.

Figure 4:
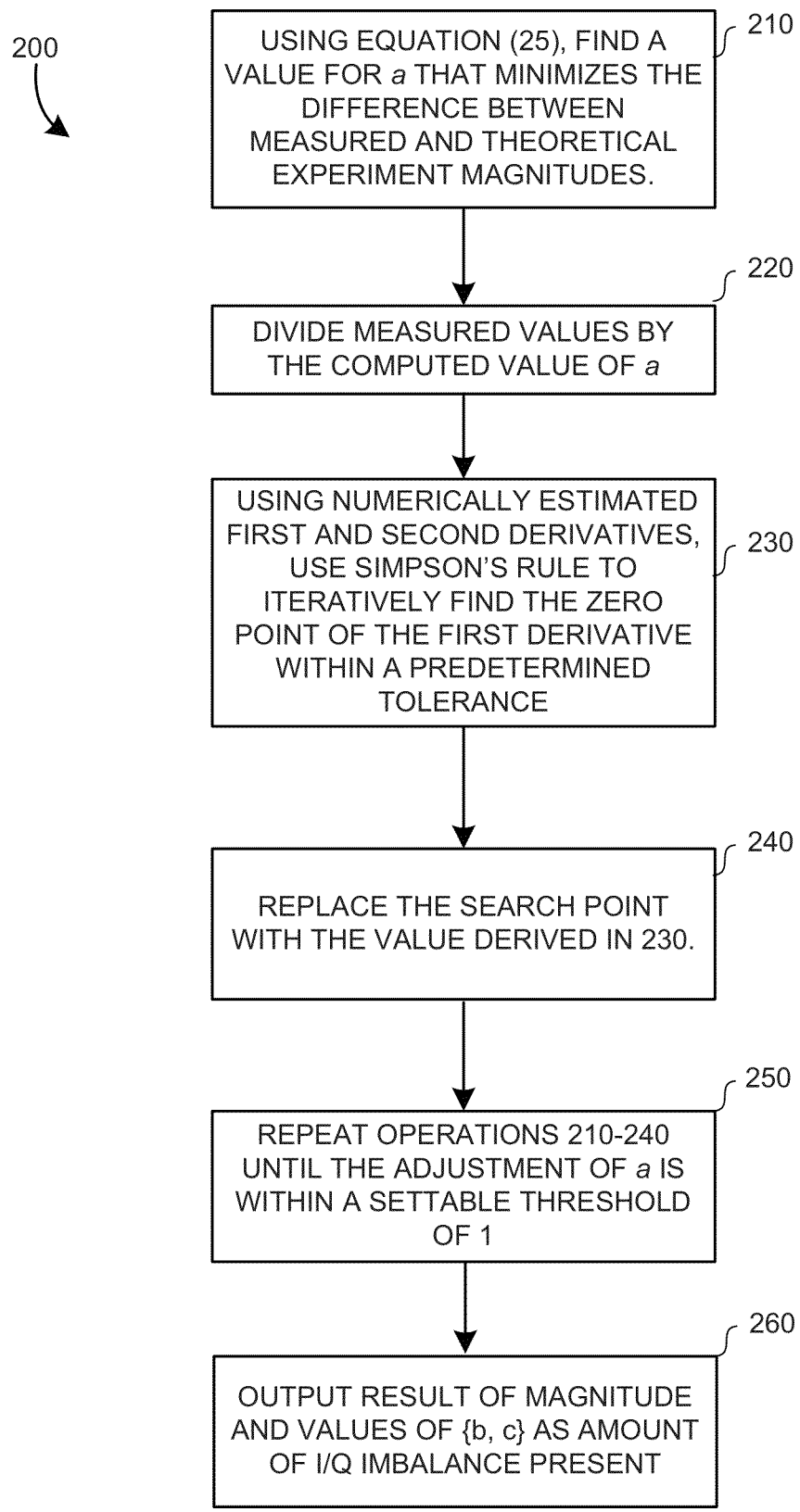
FIG. 4 is a flow diagram illustrating other example methods of determining IQ imbalance according to embodiments of the invention.

In an example flow 200, illustrated in FIG. 4, the processes 210-250 alternately adjust a, then {b, c} until a ceases to change by a significant amount between steps. The significant amount may be a programmable setting. Due to the problem structure, an incorrect value for a will result in c iterating to the wrong value. During the remaining operations of flow 200, a is permanently set to unity and the measurements m̂ are scaled instead.

In an operation 210, equation (25) is used to find a value for a which minimizes the difference between measured and theoretical experiment magnitudes. Then, in an operation 220, measured values are divided by the a value thus computed. Then, an operation 220 first numerically estimates first and second derivatives, and then uses Simpson's rule to iteratively find the zero point of the first derivative within some desired tolerance. The tolerance may be set to a predetermined value. In an operation 230, the search point is replaced with the value thus derived.

An operation 250 causes the flow 200 to repeat operations 210-240 to compute a new adjustment to a. When this adjustment is sufficiently close to one (e.g., 1±10$^{-6}$) the method has determined the correct result magnitude and the values of {b, c}. An operation 260 outputs the amount of IQ imbalance present.

To summarize the method steps described above,

1. Define (n≥3) different linear combinations (experiments) of the unknown I and Q vectors as defined in (12).

2. For each experiment, measure the magnitude (squared) of the resulting upper (or lower) sideband.

3. Use an optimization algorithm to find {a, b, c} such that (22) is minimized. Here, m is computed from (19) and m̂ contains the upper (or lower) sideband magnitudes (squared) as measured in the experiments.

Computation of the m values can be done as in ( ) or it may be more convenient to use complex number software library and compute these values as defined in (14).

An ideal IQ modulator has {a, b, c} values of:

$$\begin{bmatrix} a \\ b \\ c \end{bmatrix} = \begin{bmatrix} 1 \\ 0 \\ 1 \end{bmatrix} \quad (26)$$

and for the case of real-world IQ modulators these values make an excellent starting point for an iterative solution to the problem of determining IQ imbalance. For example, if equal magnitude test vectors are being used, then an average of the three actual magnitudes (m̄) can be used for a starting point:

$$\begin{bmatrix} a \\ b \\ c \end{bmatrix} = \begin{bmatrix} \bar{m}^2 \\ 0 \\ \bar{m}^2 \end{bmatrix} \quad (27)$$

Alternatively, if the IQ modulator being tested has been previously calibrated, previously estimated values for a, b, c may be used as a starting point.

What remains is to choose experiments (linear combinations of the I and Q vectors) that minimize the effect of measurement errors and noise. Recall that {α, β} in (12) can be complex-valued; this means that the lengths of I and Q can be scaled in the linear combinations, and they can also be rotated relative to each other. Since it is the relative angle between I and Q that matters, there is no point in rotating both I and Q, and therefore no loss of generality in forcing a to be real-valued.

Figure 5:
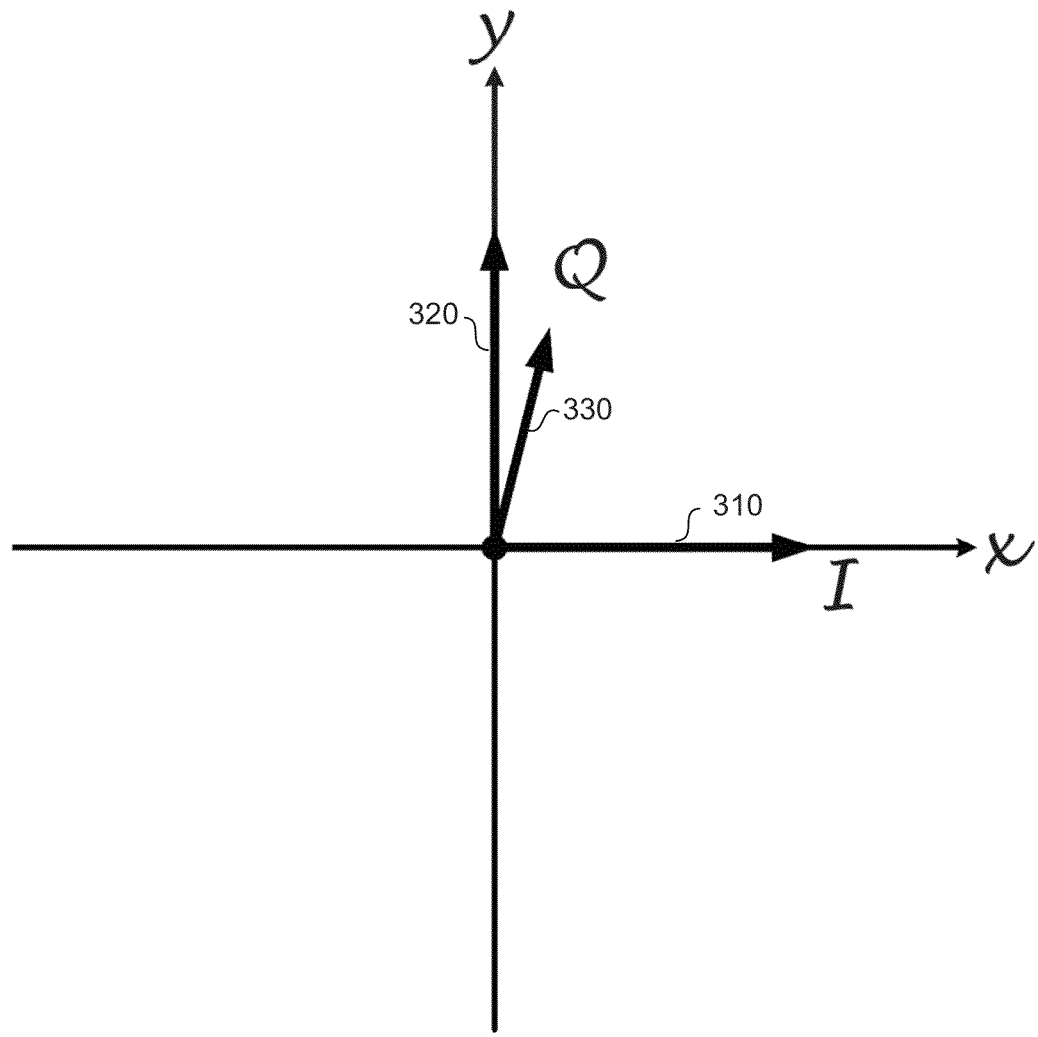
FIG. 5 is a phasor diagram illustrating example IQ imbalance that may be measured using embodiments of the invention.
Figure 6:
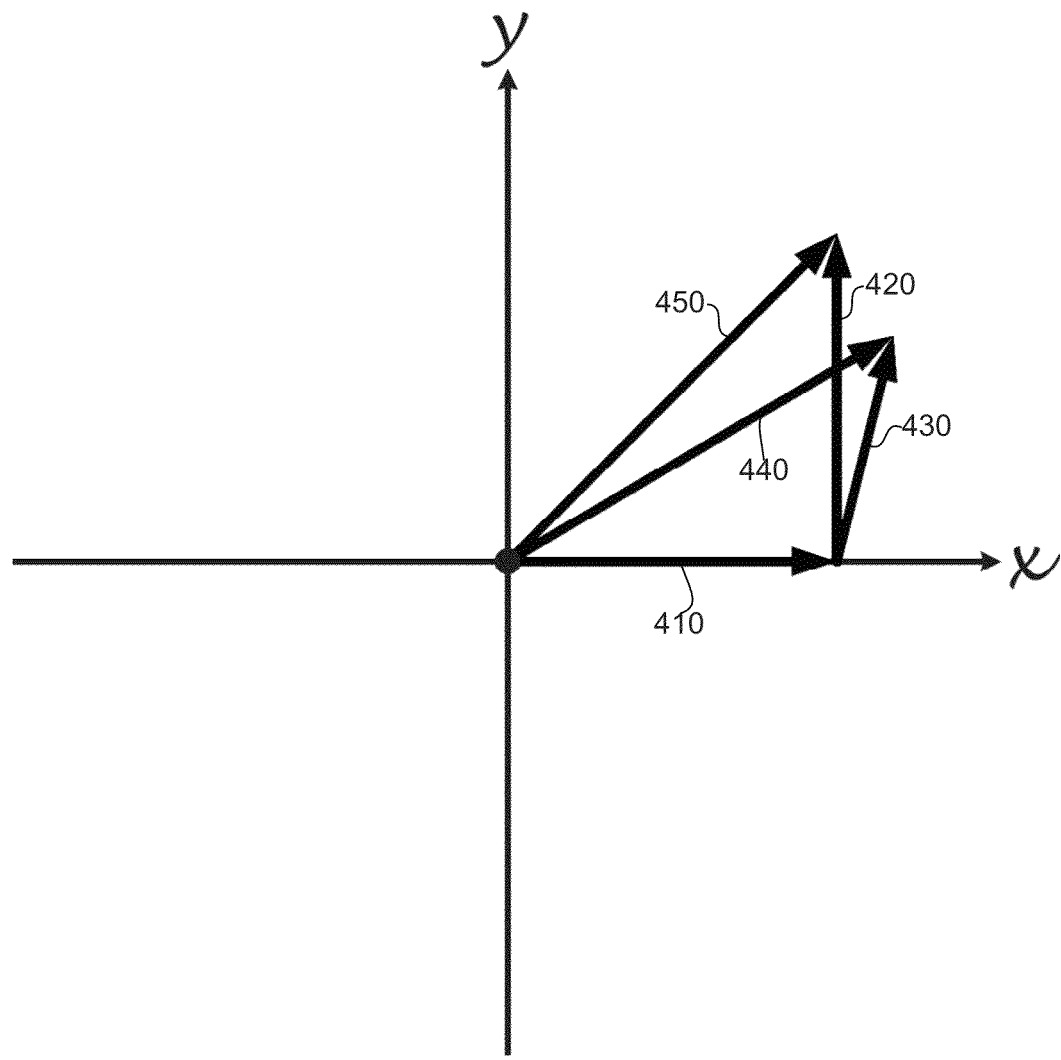
FIG. 6 is a phasor diagram illustrating how IQ imbalance has been conventionally measured.

It is helpful to depict various experiments in phasor diagrams. FIG. 5 shows an ideal I vector as 310 and an ideal Q vector as 320. A non-ideal Q vector is referenced as 330. The errant, Q vector 330 exhibits errors in both magnitude and angle (phase), relative to the I vector.

U.S. Pat. No. 7,180,937 to Matreci et al. (referred to as '937) also is directed to finding IQ imbalance using a very specific set of experiments as follows:

$$L = \begin{bmatrix} 1 & 0 \\ 0 & 1 \\ 1 & 1 \end{bmatrix} \quad (28)$$

In other words, the first experiment stimulated the I channel only, while the second experiment stimulated the Q channel, only. Then, the third experiment stimulated both the I and Q channels simultaneously. Importantly in the '937 patent, all of the experiments or signals used to stimulate the I and Q channels, individually or simultaneously, are substantially identical. This is quite different from embodiments of the invention. In the '937 patent, the first two experiments allow direct measurement of the I and Q vector magnitudes individually. The third experiment of the '937 patent is depicted in FIG. 4. Here the ideal I vector is illustrated as 410 and the ideal Q vector illustrated as 420. Vector sums of I and Q are shown as 440 and 450 to distinguish them from their I and Q constituents.

This choice has some advantages:

Signals applied to the I and Q inputs of the modulator are identical in magnitude and phase; this makes it easier to guarantee amplitude and phase accuracy, especially if it is only the modulator that is being measured.

The magnitude and phase of the Q vector (relative to I) can be easily computed using trigonometry as described in the '937 patent. In this case it is not necessary to solve a system of simultaneous non-linear equations.

The measurement method works well when large amplitude and/or phase errors exist between the I and Q vectors. These experiments also have a built-in disadvantage—namely that the amplitude values measured in these experiments are fairly insensitive to small amounts of IQ imbalance. Mathematically, this sensitivity can be found by taking three partial derivatives of $U_{\alpha, \beta}(a, b, c)$ in (15):

$$\frac{\partial U(a, b, c)}{\partial a} = 2|\alpha|^2 a + 2(\alpha_r\beta_r + \alpha_i\beta_i)b + 2(\alpha_i\beta_r - \alpha_r\beta_i)c \quad (29)$$

$$\frac{\partial U(a, b, c)}{\partial b} = 2|\beta|^2 b + 2(\alpha_r\beta_r + \alpha_i\beta_i)a \quad (30)$$

$$\frac{\partial U(a, b, c)}{\partial c} = 2|\beta|^2 c + 2(\alpha_i\beta_r - \alpha_r\beta_i)a \quad (31)$$

The choice of $\{\alpha, \beta\}$ for each experiment determines the values of these partial derivatives and represents a degree of freedom for improving accuracy of the overall methods.

The experiments chosen in the '937 patent unfortunately result in relatively low values for these partial derivatives. For example, if sideband suppression ratios of 60-70 dB are desired, then amplitude measurement errors must be kept below 0.009 dB and 0.0026 dB respectively. This is also equivalent to achieving EVM values of between 0.1% and 0.03% in a digital modulation format such as Quadrature Phase Shift Keying (QPSK).

Instead of the limited experimental test signals described in the '937 patent, many experimental test signals that do not suffer from the limitations of the '937 patent exist. For instance, one set of coarse experimental signal inputs includes:

$$L = \begin{bmatrix} 0 & 1 \\ 1 & 1 \\ 1 & -1 \end{bmatrix} \quad (32)$$

Figure 7:
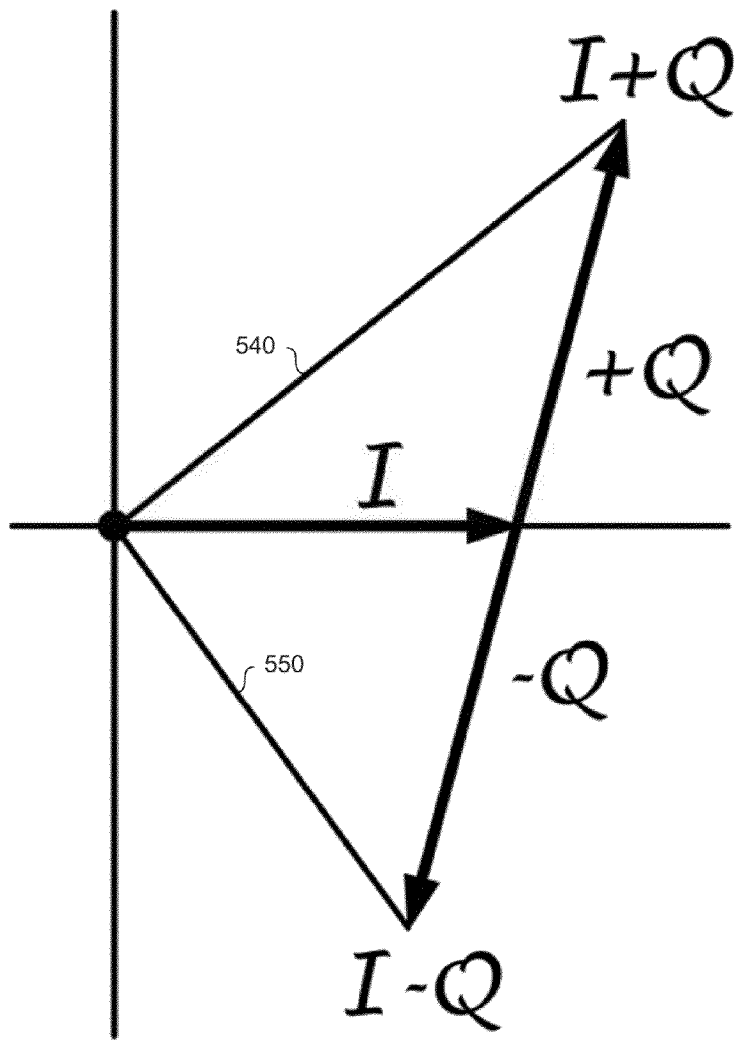
FIG. 7 is a phasor diagram illustrating outputs from a set of test signals that may be measured using embodiments of the invention to determine IQ imbalance.

The diagram in FIG. 7 shows these experiments as a phasor diagram. This set of experiments consists of three test signals:
1. The Q vector alone. Although not depicted in FIG. 7, the Q vector measurement reveals the length of the Q vector;
2. The sum of I and Q, which is depicted as 540 and labeled "I+Q"; and
3. The difference of I and Q, which is depicted as 550 and labeled "I−Q".

Figure 8:
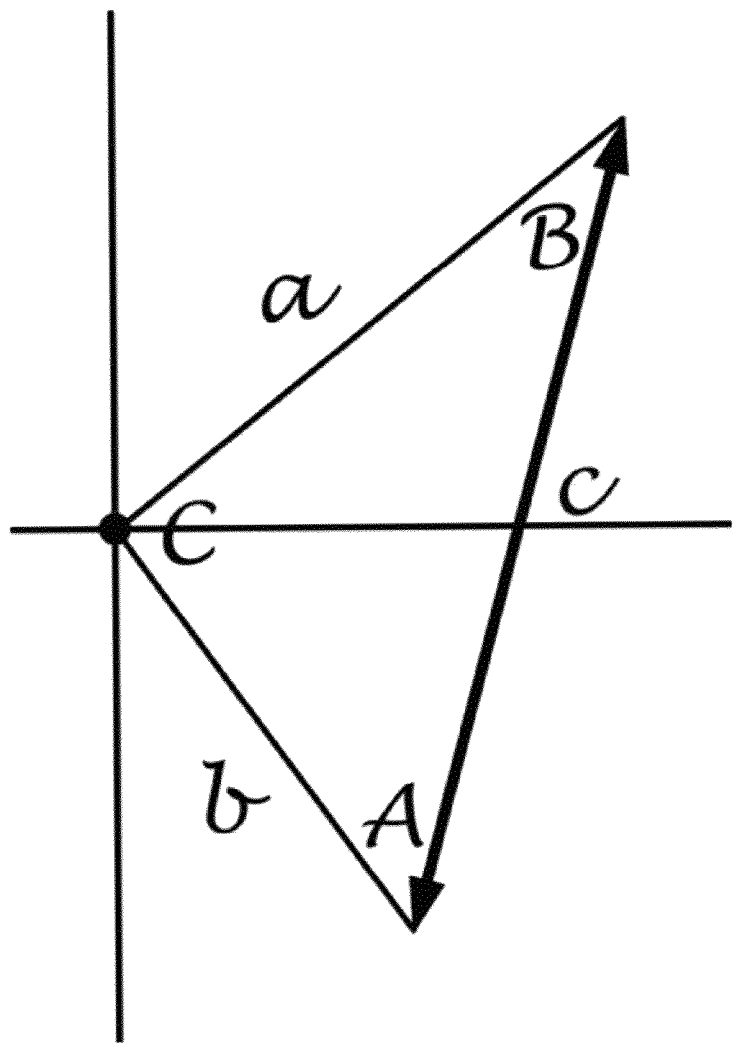
FIG. 8 is a phasor diagram illustrating outputs from the same set of test signals used to generate the phasor diagram of FIG. 7.

Using these test signals, the magnitude and phase imbalance between I and Q vectors can be solved for using trigonometry. FIG. 8 shows the experiment with the large outer triangle's sides and angles labeled with letters a, b, c; small letters for the sides and capital letters for the angles. From the experiments, the lengths of the three sides are known:
 a is the magnitude measured when I and Q were summed.
 b results from the difference between I and Q.
 c is equal to twice the measured magnitude of the Q vector.

The law of cosines can be used to solve for any of the angles, and B is of particular interest here:

$$b^2 = a^2 + c^2 - 2ac\cos B \quad (33)$$

$$B = \cos^{-1}\left(\frac{a^2 + c^2 - b^2}{2ac}\right) \quad (34)$$

Figure 9:
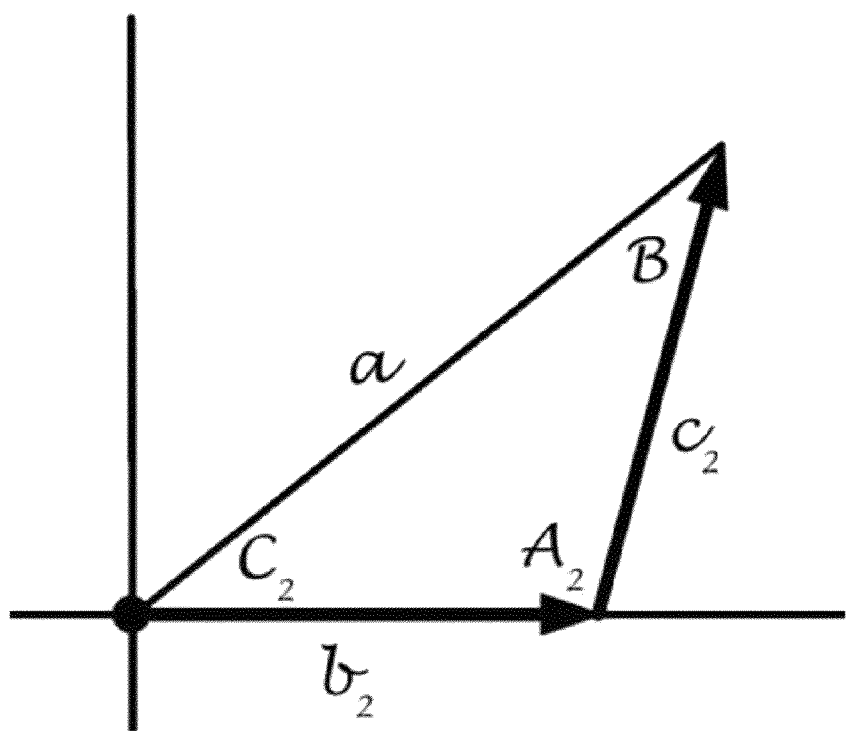
FIG. 9 is a phasor diagram illustrating an upper triangle of the phasor diagram of FIG. 8.

The desired information can be obtained now by examining the smaller upper triangle, depicted in FIG. 9. Some of the sides and angles have been labeled with subscripted letters to avoid confusion with the labels in FIG. 8. At this point, two sides and the included angle are known:
 a is the magnitude measured when I and Q were summed.
 B was computed in (34) above.
 $c_2$ is equal to the measured magnitude of the Q vector.

The length of the I vector (aka $c_2$) can be found with the law of cosines. From there the law of sines can be used to find the angle between I and Q ($A_2$).

$$b_2 = \sqrt{a^2 + c_2^2 - 2ac_2\cos B} \quad (35)$$

$$\frac{\sin A_2}{a} = \frac{\sin B}{b_2} \quad (36)$$

$$A_2 = \sin^{-1}\left(\frac{a\sin B}{b_2}\right) \quad (37)$$

In summary, equations (34), (35), (36), and (37) are used to find the lengths of the I and Q vectors, and the angle between them.

Although the above example set (32) is functional to measure IQ imbalance, it still suffers from a low sensitivity to IQ errors. A different choice of experiments can dramatically improve this situation. For example, consider the set of four experiments in (38), also depicted in FIGS. 10A-10D.

$$L = \begin{bmatrix} 1 & j0.9 \\ 1 & j1.1 \\ 1 & +0.1 + j1 \\ 1 & -0.1 + j1 \end{bmatrix} \quad (38)$$

Figure 10A:
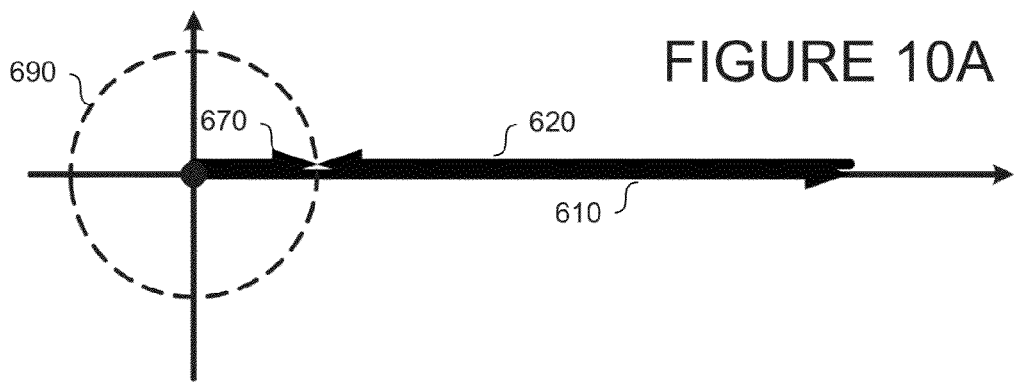
FIGS. 10A-10D are phasor diagrams of four different ideal output signals for a set of test signals used to determine IQ balance according to embodiments of the invention.
Figure 10B:
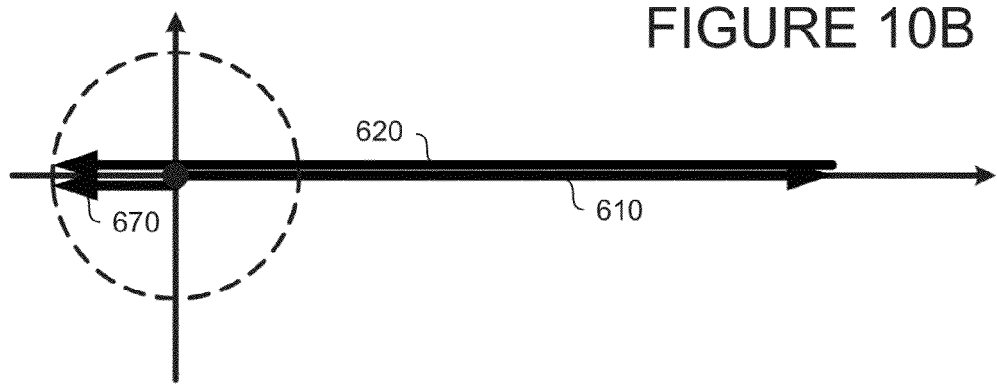
Figure 10C:
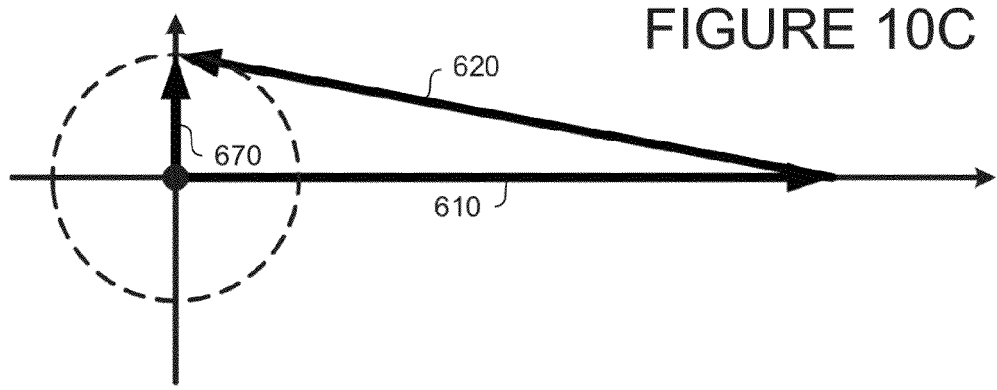
Figure 10D:
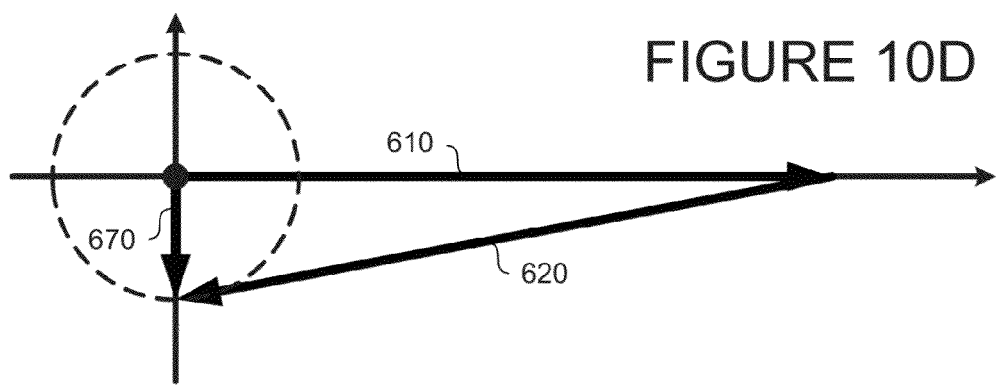
Figure 11A:
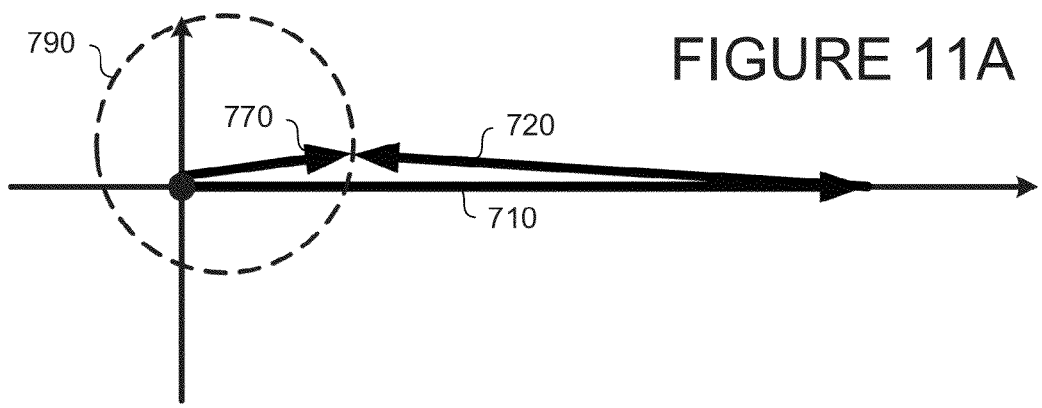
FIGS. 11A-11D are phasor diagrams of four different non-ideal output signals for a set of test signals used to determine IQ balance according to embodiments of the invention.
Figure 11B:
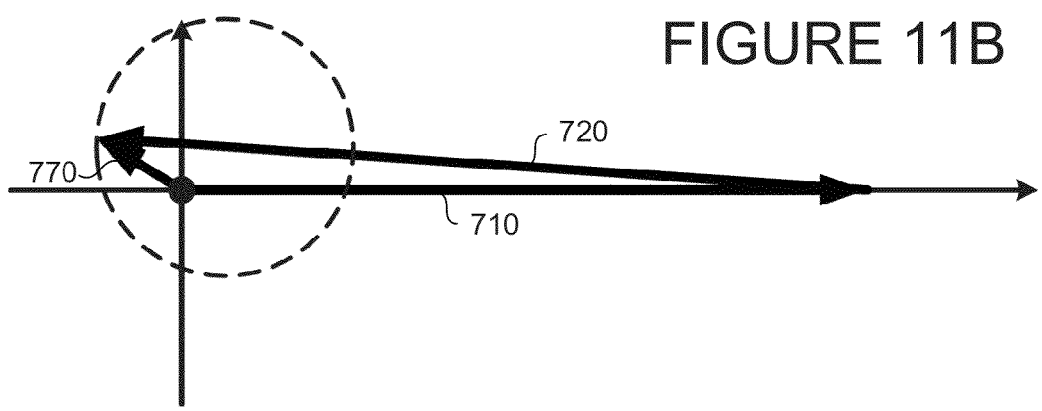
Figure 11C:
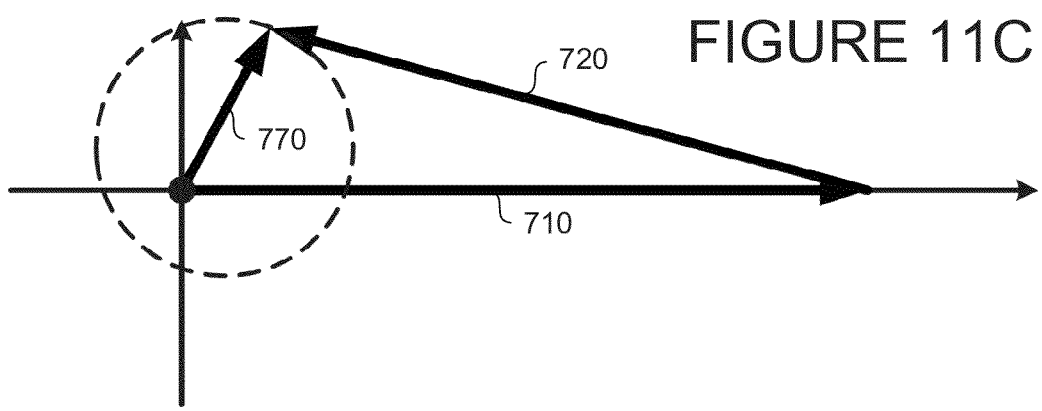
Figure 11D:
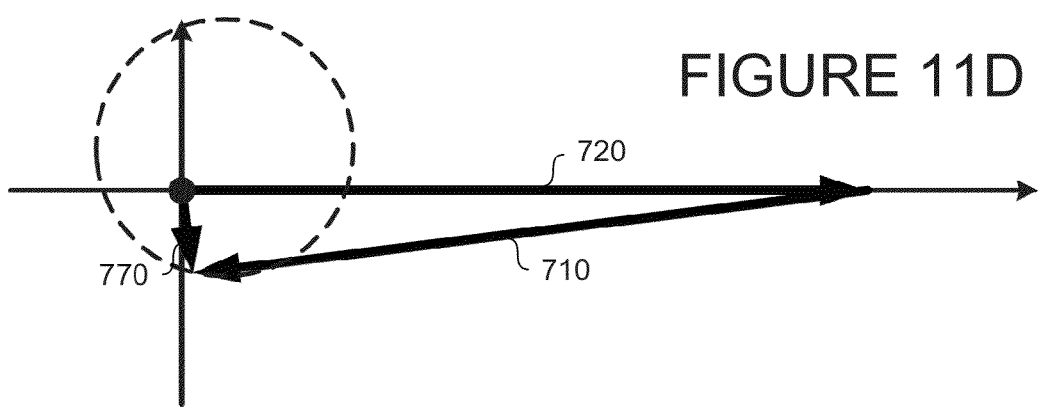

For clarity, only the ideal Q vector is plotted, and some overlapping vectors are offset slightly for better visibility. If the I and Q vectors are perfect, such as depicted in FIGS. 10-10D, each test will generate a signal whose magnitude is exactly one tenth of the magnitude of the baseband modulation signals. The four resulting output signals 670 in FIGS. 10A-10D, respectively, will (ideally) be equal in amplitude and spaced 90-degrees apart in phase. Essentially, this has sampled four equally-spaced points around a circle 690 centered on the origin (shown as a dotted line in FIGS. 10A-10D).

In each of FIGS. 10A-10D, signal 610 represents the I vector multiplied by $\alpha$, which is one for all four test cases in (38). Signal 620 represents the Q vector multiplied by $\beta$, which is different in each of the four tests specified in (38). For example, in 10A, $\beta$=j0.9. This rotates the Q vector exactly 90 degrees counter-clockwise and produces a result, 620, that is 180 degrees different than the I vector and equal in length to 90% of the I vector. When these two signals (610 and 620) are summed in the modulator, the resulting output signal, 670 has a magnitude equal to one tenth of the I vector's magnitude and is in phase with the I vector.

For another example, consider 10C. Here the test signal $\beta$=0.1+j1. This produces a result, 620 which as shown in 10C sums with the test signal 610 to produce an output from the IQ modulator, 670 which also has a magnitude of one tenth of the I vector length, but differs in phase from 670 of 10A by 90 degrees.

The resulting modulated sideband amplitudes are roughly ten times more sensitive to relative magnitude and phase errors between I and Q. As a result, measurement accuracies of 0.09 and 0.026 dB are sufficient to achieve 60 to 70 dB of sideband rejection.

FIGS. 11A-11D show the effect of I-Q imbalance on this experiment, especially when contrasted to their analogues of FIGS. 10A-10D. The experiment of test signals is designed to sample points on a circle 790 with radius equal to 10% of the I vector's length. The actual circle illustrate has a radius equal to 10% of the errant Q vector's length. The center of the circle will be located at the point $$I-jQ=(a-c)+jb \tag{37}$$

If imbalance errors are large enough, then the origin may lie outside of the circle. When this happens, experience shows that the minimization problem may not return a valid result; the presence of noise and measurement errors will exacerbate this problem. The situation can often be detected when computed errors are similar to or larger in magnitude than the expected test vectors. When application of computed corrections does not yield the expected improvement in signal quality, this is another indication of the problem. When this occurs, it may be necessary to increase the magnitude of resultant test vectors until the origin lies within the confines defined by the test vectors. In this example, if computed errors were larger than 10% in length or roughly 0.1 radians in phase, then a larger test circle would need to be used.

Various modifications to the inventive system and methods exist. For example, it is possible to improve the speed of the calibration process at the expense of accuracy by creating test signals at multiple frequencies simultaneously. This requires fewer total waveforms to be downloaded and measured, which could result in significant time savings compared to downloading and measuring multiple test signals from individual frequencies.

Although because available signal power is divided amongst a larger number of signals, signal-to-noise ratio of the overall system is degraded. This may be acceptable, however, depending on many parameters such as test signal fidelity, signal amplitudes, spectrum analyzer performance and so on. Whether the measuring results using embodiments of the invention is acceptable therefore must be determined on a case-by-case basis.

Further, there is a chance that non-linear third-order intermodulation products may wind up combining with some of the intended test signals and further polluting the measurement results. This, of course, depends on the choice of test frequencies.

Secondly, depending on the choice of test frequencies, non-linear third-order intermodulation products may wind up combining with some of the intended test signals and further polluting the measurement results. This can be avoided by judicious choice of test frequencies. In some cases such a choice limits the number of test frequencies that can be produced and requires a non-uniform distribution.

A good measure of the accuracy of these methods is the amount of resulting sideband suppression obtained by applying corrections for the estimated amplitude and phase errors. In tests using a Tektronix AWG 7102 (10-bit mode) driving Hittite HMC5xx series IQ mixers, sideband suppression ratios of at least 60 dB were consistently obtained.

Figure 12:
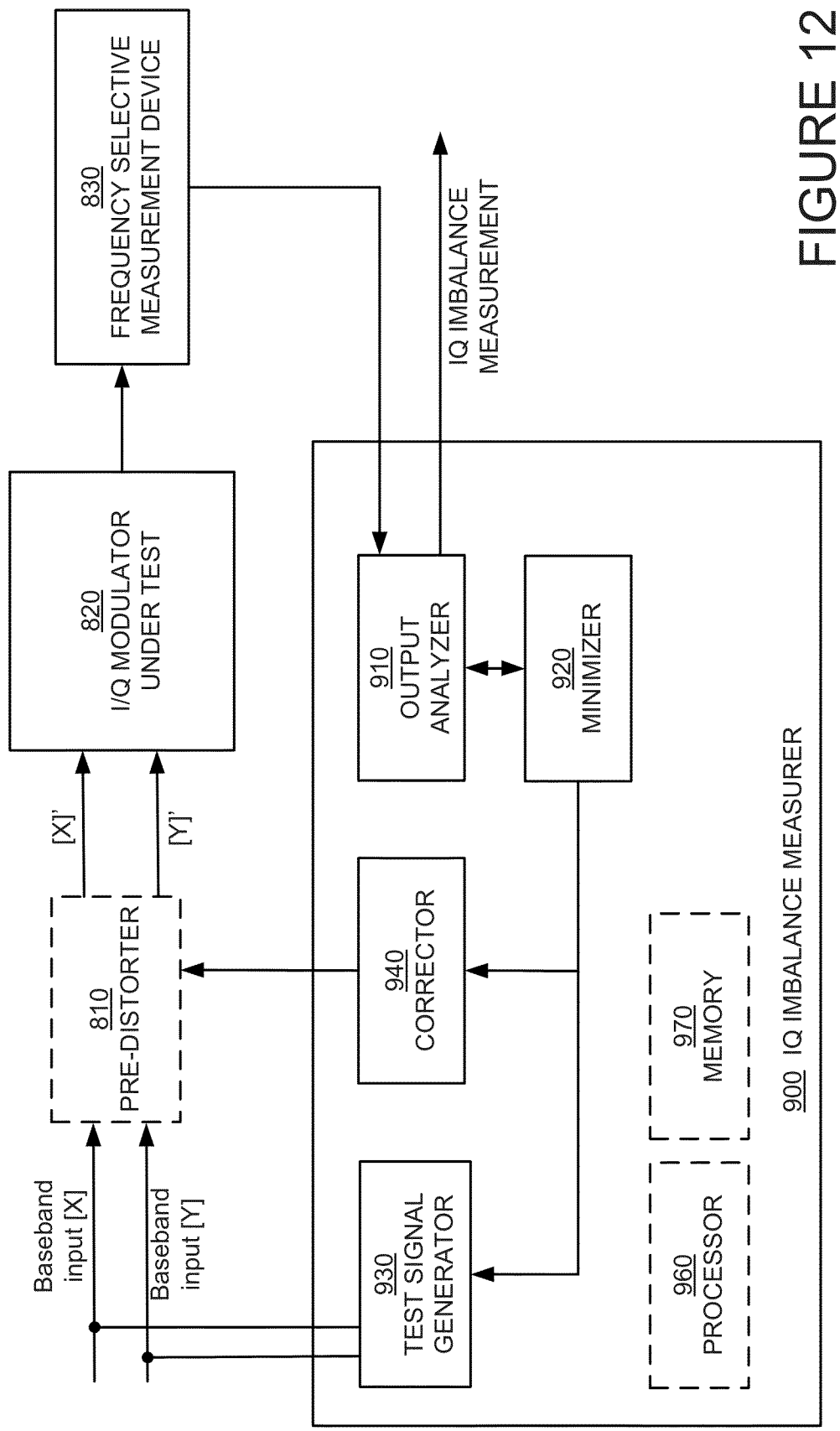
FIG. 12 is a functional block diagram illustrating components of a device for determining IQ imbalance according to embodiments of the invention.

FIG. 12 is a functional block diagram illustrating components of a measuring device 900 for determining IQ imbalance according to embodiments of the invention. In FIG. 12, an IQ modulator for testing is illustrated as 820, which has two baseband inputs x and y. The baseband inputs may also be modified by a pre-distorter 810 as described below. If the pre-distorter 810 modifies the baseband inputs x and y, then it is modified baseband inputs x' and y' that are input to the IQ modulator 820.

Test signals are provided by a test signal generator 930 of the IQ imbalance measuring device 900. Test signals are described in detail above. When applied to the baseband inputs x and y (or x' and y'), the IQ modulator 820 generates output specifically stimulated by the test signals, which may be measured by a frequency selective measurement device 830, such as a frequency analyzer or spectrum analyzer.

The output from the spectrum analyzer 830 is fed into the imbalance measuring device 900 and the output is analyzed 910 according to the above-described methods. A minimization process 920 instructs the test signal generator 930 to modify the set of test signals so that a new output from the new test signals may be measured. This repeats until a minimum test signal set, or factors of the test signal, are minimized. Finally, when the desired test signals are determined, a measurement of imbalance of the IQ modulator 820 may be separately output from the measurer 900. Additionally, a corrector processor 940 may generate codes, such as filter parameters or other data to be sent to the pre-distorter 810 so that any effects of the measured IQ imbalance may be minimized. As described above, the baseband inputs x and y may be modified in the pre-distorter 810, and one of the reasons for such modification may be to reduce the effects of the IQ imbalance of the modulator 820 being tested.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A method of determining imbalance in an IQ modulator having an I channel and a Q channel, the method comprising:
    applying a set of at least three test signals to the I channel and Q channel of the IQ modulator to generate an output of the IQ modulator, wherein at least one of the test signals is substantially different than other test signals in the set, and the test signals are different linear combinations of I and Q vectors;
    receiving a frequency specific output from a frequency measuring device coupled to the output of the IQ modulator;
    measuring one or more values of the frequency specific output; and
    deriving the imbalance in the IQ modulator from the measured values.

2. The method of determining imbalance in an IQ modulator of claim 1 in which measuring one or more values of the frequency specific output comprises calculating a distance, the method further comprising:
    adjusting the at least three test signals in the set of test signals until the calculated distance is a minimum desired distance.

3. The method of determining imbalance in an IQ modulator of claim 2 in which adjusting the at least three test signals in the set of test signals until the calculated distance is a minimum desired distance comprises:

adjusting a factor of at least one of the at least three test signals in the set until the calculated distance does not change more than a threshold amount when the factor is adjusted less than a threshold amount.

4. The method of determining imbalance in an IQ modulator of claim 1 in which measuring one or more values of the frequency specific output comprises:

measuring an amplitude of a sideband signal.

5. The method of determining imbalance in an IQ modulator of claim 1 in which deriving the imbalance in the IQ modulator from the measured values comprises:

determining a length of an I vector;
determining a length of a Q vector; and
calculating an angle between the I vector and the Q vector.

6. The method of determining imbalance in an IQ modulator of claim 1 in which the set of at least three test signals comprises a set of four test signals, and in which an output of each of the set of four test signals would be equal in amplitude and spaced 90 degrees apart in phase if the IQ modulator were an ideal modulator.

7. The method of determining imbalance in an IQ modulator of claim 6 further comprising applying the set of at least four test signals to a non-ideal IQ modulator.

8. The method of determining imbalance in an IQ modulator of claim 1 in which the set of test signals comprises at least one test signal that includes multiple simultaneous frequencies.

9. A device structured to determine imbalance of an IQ modulator having an I channel and a Q channel, the device comprising:

a test signal generator structured to generate a set of test signals for the IQ modulator, wherein the test signals are different linear combinations of I and Q vectors;

an output analyzer structured to receive a frequency specific output of the test signals from a measurement device coupled to an output of the IQ modulator; and a minimizer structured to cause the test signal generator to generate a set of test signals that cause a distance measured from the frequency specific output to be a minimum distance.

10. The device structured to determine imbalance of an IQ modulator of claim 9 in which the test signal generator adjusts a factor of the test signals.

11. The device structured to determine imbalance of an IQ modulator of claim 10 in which adjusting the factor causes the distance measured from the frequency specific output to be modified.

12. The device structured to determine imbalance of an IQ modulator of claim 9, further comprising a corrector coupled to the minimizer, and in which corrector is structured to generate a signal that causes at least one input signal to be modified before being applied to the I channel and the Q channel.

* * * * *